(12) United States Patent
Davis et al.

(10) Patent No.: US 7,727,095 B2
(45) Date of Patent: *Jun. 1, 2010

(54) HOCKEY STICK HAVING A SINGLE, HOLLOW PRIMARY TUBE

(75) Inventors: Stephen J. Davis, Newtown, PA (US); Roberto Gazzara, Mestre (IT); Mauro Pinaffo, Camposampiero (IT); Michele Pozzobon, Fossalunga di Vedelago (IT); Mauro Pezzato, Treviso (IT)

(73) Assignee: Prince Sports, Inc., Bordentown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/584,198

(22) Filed: Oct. 20, 2006

(65) Prior Publication Data

US 2007/0275799 A1  Nov. 29, 2007

(30) Foreign Application Priority Data

May 29, 2006  (EP) .................................. 06114815

(51) Int. Cl.
*A63B 59/14* (2006.01)
*A63B 59/12* (2006.01)
*A63B 59/02* (2006.01)

(52) U.S. Cl. ...................................... 473/561; 473/513

(58) Field of Classification Search ......... 473/560–568, 473/513, 316–321, 519, 520, 549–551, 539
See application file for complete search history.

(56) References Cited

U.S. PATENT DOCUMENTS

| | | | |
|---|---|---|---|
| 59,313 A * | 10/1866 | Hill ............................. 473/564 |
| 729,639 A * | 6/1903 | McCoy ....................... 473/520 |
| 1,025,478 A | 5/1912 | Murphy | |
| 1,530,427 A | 3/1925 | Simon | |
| 2,033,722 A | 3/1936 | MacFarland | |
| 2,321,773 A | 6/1943 | Rumelin | |
| 3,377,066 A | 4/1968 | Trowbridge | |
| 3,392,976 A | 7/1968 | Hayes | |
| 3,664,668 A * | 5/1972 | Held ........................... 473/537 |
| 4,086,115 A | 4/1978 | Sweet | |
| 4,124,208 A | 11/1978 | Burns | |
| 4,264,389 A | 4/1981 | Staub | |
| 4,358,113 A * | 11/1982 | McKinnon et al. .......... 473/561 |
| 4,600,193 A | 7/1986 | Merritt | |
| 4,795,153 A | 1/1989 | Thomas | |

(Continued)

FOREIGN PATENT DOCUMENTS

CA  2154370  3/1997

(Continued)

OTHER PUBLICATIONS

US 7,223,188, 05/2007, Davis (withdrawn)

*Primary Examiner*—Mark S Graham
(74) *Attorney, Agent, or Firm*—Abelman, Frayne & Schwab

(57) ABSTRACT

A handle is adapted to be held by a player and a striking end is adapted to contact and propel an object. A structure for a hockey stick is described by using a single, hollow tube of composite material, wherein tubular "ports" extend through the hollow tube. The ends of the ports are bonded to the walls of the hollow tube. The ports improve the stiffness, strength, aerodynamics and comfort of the hockey stick.

16 Claims, 4 Drawing Sheets

U.S. PATENT DOCUMENTS

| | | | |
|---|---|---|---|
| 4,931,247 A | 6/1990 | Yeh | |
| 5,082,279 A | 1/1992 | Hull | |
| 5,097,870 A | 3/1992 | Williams | |
| 5,153,798 A | 10/1992 | Ruigrok | |
| 5,179,255 A * | 1/1993 | Yeh | 181/182 |
| 5,249,846 A | 10/1993 | Martin | |
| 5,285,008 A | 2/1994 | Sas-Jaworsky | |
| 5,297,791 A | 3/1994 | Negishi | |
| 5,301,940 A | 4/1994 | Seki | |
| 5,303,916 A | 4/1994 | Rodgers | |
| 5,419,553 A | 5/1995 | Rodgers | |
| 5,516,100 A * | 5/1996 | Natsume | 473/535 |
| 5,614,305 A | 3/1997 | Paine | |
| 5,636,836 A | 6/1997 | Carroll | |
| 5,746,955 A | 5/1998 | Calapp | |
| 5,766,104 A * | 6/1998 | Albarelli, Jr. | 473/567 |
| 5,865,696 A | 2/1999 | Calapp | |
| 5,879,250 A | 3/1999 | Tahtinen | |
| 5,975,645 A | 11/1999 | Sargent | |
| 6,042,493 A * | 3/2000 | Chauvin et al. | 473/566 |
| 6,086,161 A | 7/2000 | Luttgeharm | |
| 6,113,508 A | 9/2000 | Locarno | |
| 6,129,962 A * | 10/2000 | Quigley et al. | 428/36.1 |
| 6,241,633 B1 | 6/2001 | Conroy | |
| 6,383,101 B2 | 5/2002 | Eggiman | |
| 6,485,382 B1 | 11/2002 | Chen | |
| 6,663,517 B2 | 12/2003 | Buiatti | |
| 6,723,012 B1 | 4/2004 | Sutherland | |
| 6,761,653 B1 | 7/2004 | Higginbotham | |
| 6,764,419 B1 | 7/2004 | Giannetti | |
| 6,776,735 B1 | 8/2004 | Belanger | |
| 6,800,239 B2 | 10/2004 | Davis | |
| 6,808,464 B1 | 10/2004 | Nguyen | |
| 6,866,598 B2 | 3/2005 | Giannetti | |
| 6,872,156 B2 | 3/2005 | Ogawa | |
| 7,014,580 B2 | 3/2006 | Forsythe | |
| 7,207,907 B2 * | 4/2007 | Guenther et al. | 473/566 |
| 7,309,299 B2 | 12/2007 | Pezzato | |
| 7,396,303 B2 | 7/2008 | Gazzara | |
| 2003/0104152 A1 | 6/2003 | Sommer | |
| 2003/0162613 A1 | 8/2003 | Davis | |
| 2004/0048683 A1 | 3/2004 | Burrows | |
| 2004/0198538 A1 * | 10/2004 | Goldsmith et al. | 473/563 |
| 2005/0062337 A1 | 3/2005 | Meggiolan | |
| 2005/0153799 A1 * | 7/2005 | Rigoli | 473/513 |
| 2005/0164814 A1 | 7/2005 | Tucker | |
| 2005/0221924 A1 | 10/2005 | Sutherland | |
| 2006/0122013 A1 * | 6/2006 | Dodge et al. | 473/516 |
| 2006/0247077 A1 | 11/2006 | Deetz | |
| 2007/0123376 A1 | 5/2007 | Gazzara | |
| 2007/0135245 A1 | 6/2007 | Gazzara | |
| 2007/0200422 A1 | 8/2007 | Davis | |
| 2007/0222178 A1 | 9/2007 | Davis | |
| 2007/0238560 A1 | 10/2007 | Gazzara | |
| 2007/0293344 A1 | 12/2007 | Davis | |

FOREIGN PATENT DOCUMENTS

| | | |
|---|---|---|
| CA | 2231908 | 9/1999 |
| DE | 4415509 | 11/1995 |
| EP | 1859838 | 11/2007 |
| EP | 1859839 | 11/2007 |
| JP | 53038431 | 4/1978 |
| JP | 02255164 | 10/1990 |
| JP | 05015624 | 1/1993 |
| JP | 09117968 | 5/1997 |
| JP | 11276652 | 10/1999 |
| JP | 2000042155 | 2/2000 |
| WO | WO 84/03447 | 9/1984 |
| WO | WO 94/26361 | 11/1994 |
| WO | WO 00/09219 | 2/2000 |
| WO | WO 01/26752 | 4/2001 |
| WO | WO 03/076176 | 9/2003 |
| WO | WO 2004/075996 | 9/2004 |

* cited by examiner

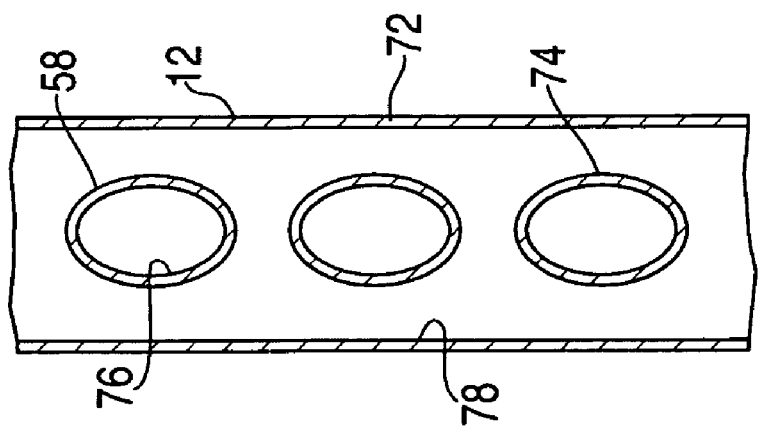
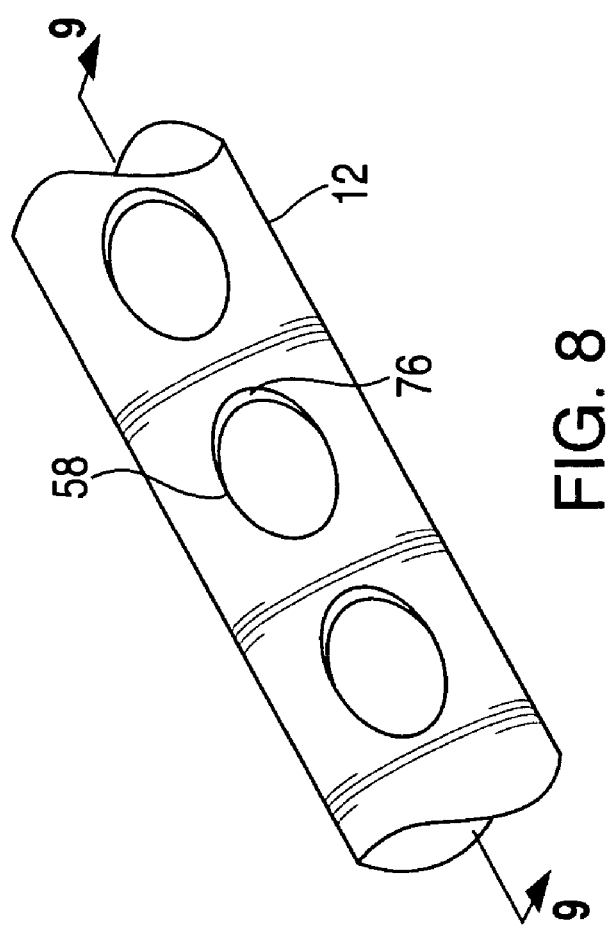

HOCKEY STICK HAVING A SINGLE, HOLLOW PRIMARY TUBE

BACKGROUND OF THE INVENTION

The present invention relates to a composite structure for a hockey stick.

Hockey stick systems have traditionally been made from wood. Wood has been a convenient and traditional material to use but is limited in strength and weight. The wood stick is solid and can be made from a multi ply lamination in order to improve strength.

Recent developments have improved hockey sticks by making them out of metal such as aluminum. Such sticks are typically made from a one piece extruded aluminum tube to which can be attached a blade and handle. The tubular construction offers a lighter weight and also easy attachment for the blade and handle.

More recent developments have advanced hockey stick performance by using composite materials such as fiber reinforced resins such as carbon fiber in an epoxy resin. These sticks are tubular in form to maximize strength and minimize weight.

Composite materials are attractive alternatives to wood, because there exists a large selection of fiber types and resin types, the combinations of which can produce a multitude of options suitable for replacement to wood. These composite laminates have the advantage of being stiffer, stronger, and less susceptible to environmental changes than wood.

One of the first patents describing composite materials used for hockey sticks is U.S. Pat. No. 4,086,115 to Sweet which discloses a tubular hockey stick manufactured using fiberglass fibers in a polyester resin made using a pultrusion process.

U.S. Pat. Nos. 5,419,553 and 5,303,916 to Rogers disclose an improved hockey stick made from composite materials, also made using the pultrusion process, with the addition of specific fiber orientation in order to improve the stiffness and strength of the stick.

The pultrusion process has also been used to create a hockey stick of two tubes with an internal wall in between. U.S. Pat. Nos. 5,549,947, 5,688,571, 5,888,601, 6,129,962 to Quigley, et. al., describe a continuous manufacturing operation to produce a hockey stick with continuous fiber reinforcement. The limitations of making a hockey stick using a pulltrusion process are that fiber placement cannot be changed along the length of the structure and the cross-section cannot be varied along its length.

U.S. Pat. No. 5,636,836 to Carroll, U.S. Pat. No. 5,746,955 to Calapp, U.S. Pat. No. 5,865,696 to Calapp, and U.S. Pat. No. 6,241,633 to Conroy all describe tubular hockey stick systems made from fiber reinforced resin materials with specific fiber orientation in order to achieve desired performance characteristics.

There exists a continuing need for an improved hockey stick system. In this regard, the present invention substantially fulfills this need.

SUMMARY OF THE INVENTION

The present invention is a hockey stick where the handle is formed of a single, hollow tube having at least one, and preferably a series, of "ports" that extend through the hollow handle tube. The ports provide specific performance advantages. Each port has a peripheral wall that extends between opposed holes in the hollow handle tube. The opposite ends of each port are bonded to the handle tube. The wall forming the port, which extends between opposite sides of the handle tube, preferably is shaped to act as opposing arches which provide additional strength, stiffness, comfort, and aerodynamic benefits.

The hockey stick system according to the present invention substantially departs from the conventional concepts and designs of the prior art and in doing so provides an apparatus primarily developed for the purpose of improved aerodynamics, strength and appearance.

The present invention is designed to provide a combination of tailored stiffness, greater strength, light weight, greater comfort, improved aerodynamics, and improved aesthetics over the current prior art.

In view of the foregoing commonality inherent in the known types of hockey sticks of known designs and configurations now present in the prior art, the present invention provides an improved hockey stick system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The present invention provides a new and improved hockey stick system which may be easily and efficiently manufactured.

The present invention provides a new and improved hockey stick system which is of durable and reliable construction.

The present invention provides a new and improved hockey stick system which may be manufactured at a low cost with regard to both materials and labor.

The present invention further provides a hockey stick system that can provide specific stiffness zones at various orientations and locations along the length of the shaft.

The present invention provides an improved hockey stick system that has superior strength and fatigue resistance.

The present invention provides an improved hockey stick system that has improved shock absorption and vibration damping characteristics.

The present invention provides an improved hockey stick system that has improved aerodynamics.

The present invention provides an improved hockey stick system that has a unique look and improved aesthetics.

Lastly, the present invention provides a new and improved hockey stick system made with a single tube design, where apertures, i.e., "ports," that extend through opposed holes in the handle tube act, and preferably are shaped as double opposing arches to provide a means of adjusting the stiffness, resiliency, strength, comfort, and aerodynamics of the implement.

For a better understanding of the invention and its advantages, reference should be made to the accompanying drawings and descriptive matter in which there are illustrated preferred embodiments of the invention.

BRIEF DESCRIPTION OF THE DRAWINGS

FIG. 8 is an enlarged, isometric view of a portion of the handle of FIGS. 1-2 after molding.

FIG. 9 is a sectional view of a portion of the handle, taken in the direction of arrows 9-9 in FIG. 8.

The same reference numerals refer to the same parts throughout the various Figures.

DETAILED DESCRIPTION OF THE INVENTION

Figure 1:
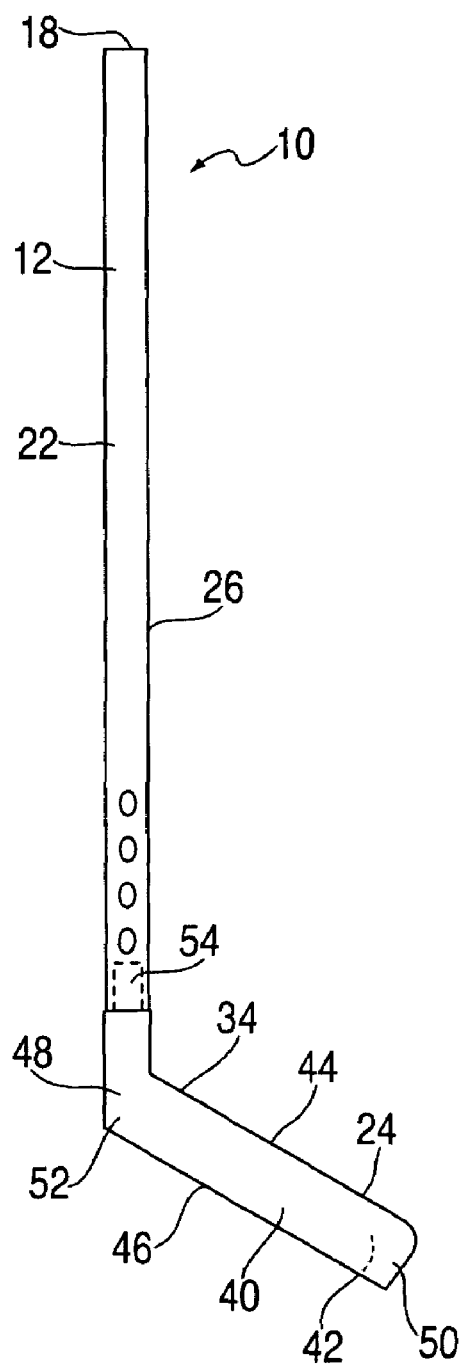
FIG. 1 is a front elevational view of a hockey stick system, shaft and blade, constructed in accordance with the principles of the present invention.
Figure 2:
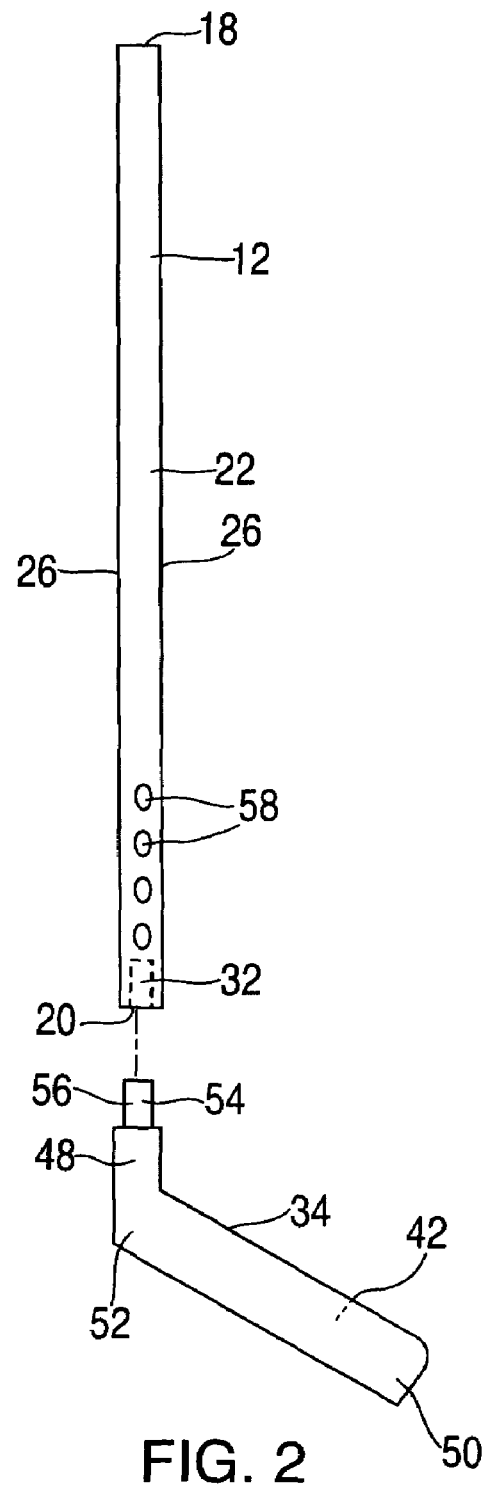
FIG. 2 is an exploded front elevational view of the hockey stick system shown in FIG. 1.

With greater reference to FIGS. 1-2 of the drawings, the present invention is a composite hockey stick system 10. The system features geometric shapes in the shaft for improving the flexibility, strength and other playing characteristics of the system. The system comprises a handle 12 and a striking end 34, i.e., a blade. The stick handle 12 is fabricated of multiple layers of aligned carbon filaments held together with an epoxy binder, i.e., so-called "graphite" material. The fibers in the various plies are parallel to one another, but the various plies preferably have varying fiber orientations.

The stick handle 12 has a long generally hollow rectangular configuration with a top end 18, a bottom end 20, a front face 22, a rear face opposite the front face, and a pair side faces 26. The stick has a recessed opening 32 in the bottom end 20 thereof for attaching the blade 34.

The stick striking end 34 is preferably also fabricated of multiple layers of aligned carbon filaments held together with an epoxy binder however, the plies of the blade may have different fiber orientations than the handle).

The stick striking end 34 has a generally thin rectangular configuration with a first face 40, a second face 42, an upper edge 44, a lower edge 46, a near end 48, and a far end 50. The near end has a bend 52 at an angle between 45 degrees and 80 degree and being preferably 65 degrees measured between the side faces of the stick handle end and the upper edge and the lower edge. The upper end 48 of the blade has a male fitting 54 extending therefrom, with the fitting 54 being adapted to couple into the opening 32 in the bottom end of the stick handle end.

An adhesive 56 couples the stick handle with the stick striking end between the connecting bar and the opening in the stick handle end.

The stick handle end and the stick striking end are configured together to form a shaft which is generally linear in shape.

A plurality of "ports" 58 are formed in the stick handle, preferably near the bottom end 20. The ports extend between the front face 22 and the rear face. Each aperture is preferably oval in shape, with the long axis of the oval in line with the vertical axis of the shaft. Each port includes a peripheral wall that extends between the front face 22 and the rear face, whose ends are bonded to the tubular handle 12.

The ports are preferably in the shape of double opposing arches which allow the structure to deflect, which deforms the ports, and return with more resiliency. The ports also allow greater bending flexibility than would traditionally be achieved in a single tube design. The structure can also improve comfort by absorbing shock and damping vibrations due to the deformation of the ports. Finally, the ports can improve aerodynamics by allowing air to pass through the shaft to reduce the wind resistance and improve maneuverability.

The handle tube is preferably made from a long fiber reinforced prepreg type material. Traditional lightweight composite structures have been made by preparing an intermediate material known as a prepreg which will be used to mold the final structure.

A prepreg is formed by embedding the fibers, such as carbon, glass, and others, in resin. This is typically done using a prepreg machine, which applies the non-cured resin over the fibers so they are all wetted out. The resin is at an "B Stage" meaning that only heat and pressure are required to complete the cross linking and harden and cure the resin. Thermoset resins like epoxy are popular because they are available in liquid form at room temperature, which facilitates the embedding process.

A thermoset is created by a chemical reaction of two components, forming a material in a nonreversible process. Usually, the two components are available in liquid form, and after mixing together, will remain a liquid for a period of time before the crosslinking process begins. It is during this "B Stage" that the prepreg process happens, where the resin coats the fibers. Common thermoset materials are epoxy, polyester, vinyl, phenolic, polyimide, and others.

The prepreg sheets are cut and stacked according to a specific sequence, paying attention to the fiber orientation of each ply.

Each prepreg layer comprises an epoxy resin combined with unidirectional parallel fibers from the class of fibers including but not limited to carbon fibers, glass fibers, aramid fibers, and boron fibers.

The prepreg is cut into strips at various angles and laid up on a table. The strips are then stacked in an alternating fashion such that the fibers of each layer are different to the adjacent layers. For example, one layer may be 30 degrees, the next layer –30 degrees. If more bending stiffness is desired, a lower angle such as 20 degrees can be used. If more torsional stiffness is desired, a higher angle such as 45 degrees can be used. In addition, 0 degrees can be used for maximum bending stiffness, and 90 degrees can be used to resist impact forces and to maintain the geometric structural shape of the tube.

This layup, which comprises various strips of prepreg material, is then rolled up into a tube.

Figure 3:
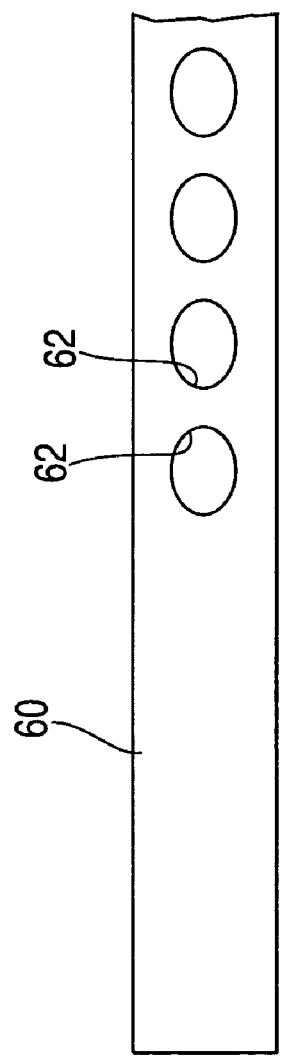
FIG. 3 is a front view of a portion of a prepreg tube during formation of the handle of FIGS. 1-2.

Referring to FIG. 3, according to the preferred embodiment of the invention, a suitable prepreg tube 60 is formed in the manner just described, with the various composite plies oriented at the desired angles. Next, a plurality of openings 62 are formed through opposing walls the tube, perpendicular to the axis of the tube. The openings 62 may be stamped through the walls. More preferably, a tool is used to separate the carbon fibers from one another, without cutting the fibers, to form the openings 62. The openings, at this stage, need not have the final desired shape.

Figure 4:
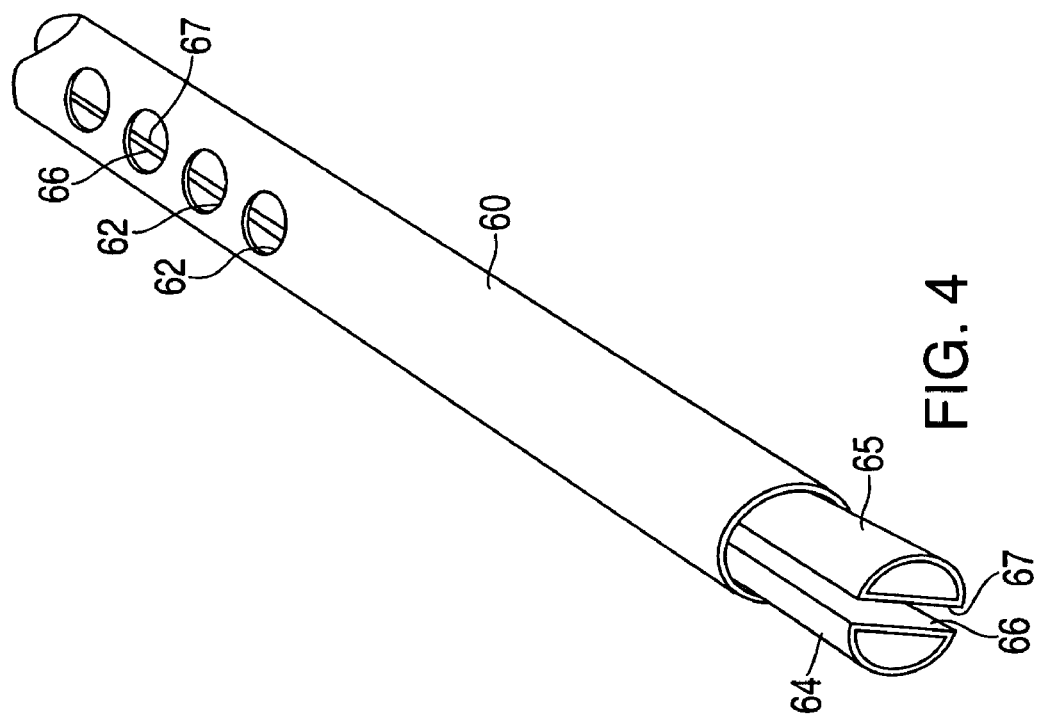
FIG. 4 is an isometric view of the prepreg tube of FIG. 3 during a subsequent step in forming the handle.

Referring to FIG. 4, next a pair of inflatable thin walled polymeric bladders 64, 65, preferably made of nylon, are inserted through the tube 60 such that their facing walls 66, 67 are aligned with the openings 62.

Figure 5:
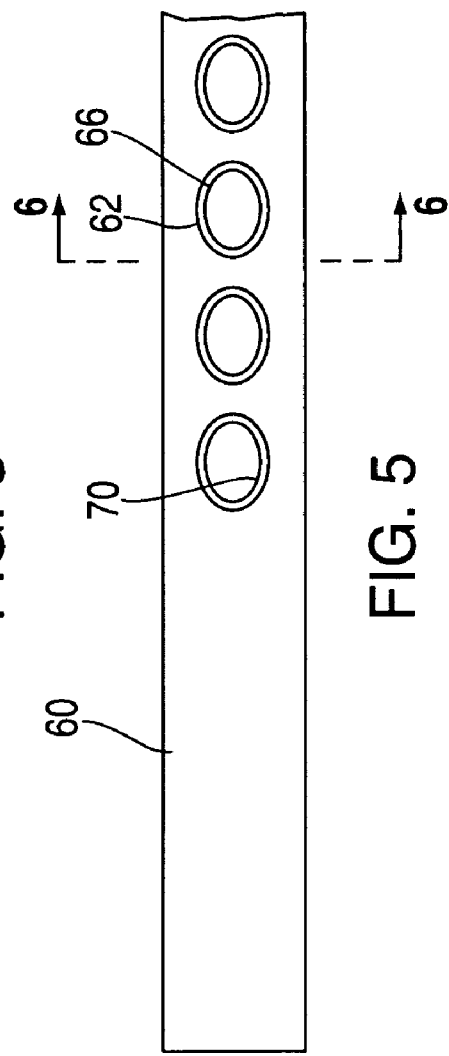
FIG. 5 is a front view of the prepreg tube of FIG. 4 during a subsequent step in forming the handle.
Figure 6:
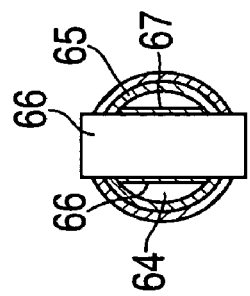
FIG. 6 is a sectional view of the prepreg tube of FIG. 5, taken in the direction of arrows 6-6 of FIG. 5.

Referring to FIGS. 5-6, after the bladders 64, 65 have been inserted, a hollow, tubular plug 66 is inserted through each of the holes 62, between the facing walls 66, 67 of the bladders, i.e., separating the bladders. The ends of the plugs 66 preferably extend beyond the outer surfaces of the prepreg tube 60, as shown in FIG. 6. The plugs are preferably tubes of prepreg material. However, if desired the plugs may be made of other materials such as metal or plastic.

Figure 7:
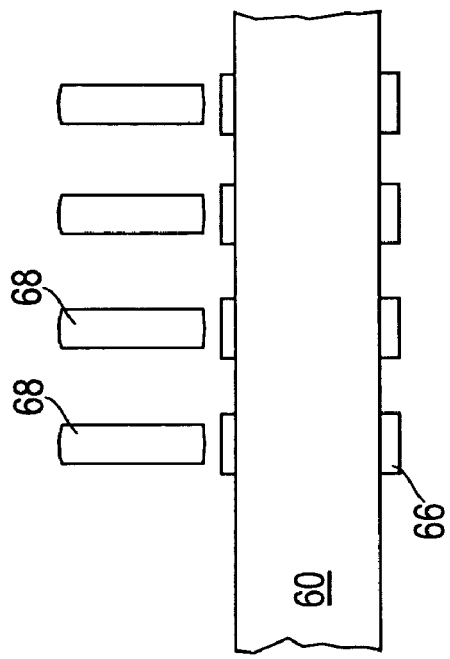
FIG. 7 is a side view of the prepreg tube of FIG. 5 during a subsequent step in the formation of the handle.

Finally, as shown in FIG. 7, if the plugs 66 are formed of prepreg material, a mold pin 68 is inserted through each plug 66 to form the internal geometry of the ports. This may occur prior to mold packing, or during the mold packing process.

The tube is then packed into a mold which forms the shape of the hockey stick handle. If the mold and tube are longer than the final desired dimension of the hockey stick handle, a final cut to length operation can be performed on the handle 12 after molding.

Air fittings are applied to the interior of the bladders 64 and 65 at the end of the tube 60. Preferably, the bladders are closed on the other end of the handle, or are connected in the shape of a hairpin to form one continuous "U" shaped bladder inside the tube 60. The mold is then closed over the tube 60 and placed in a heated platen press. For epoxy resins, the temperature is typically around 350 degrees F. While the mold is being heated, the tube 60 is internally pressurized, which compresses the prepreg material and forces the tube 60 to assume the shape of the mold. At the same time, the heat cures the epoxy resin. The bladders also compress the peripheral walls of the plugs 66, so that the inwardly facing surface 70 of each plug 66 conforms to the shape of the mold pin 68 (which is preferably oval). At the same time, the heat and pressure cause the ends of the plug walls to bond to the wall of the prepreg tube 60.

Once cured, the mold is opened in the reverse sequence of packing. The pins 68 are typically removed first, followed by the top portion of the mold. Particular attention is needed if removing the top portion with the pins 68 intact to ensure that this is done in a linear fashion. Once the pins 68 have been removed from the handle 12, the handle can be removed from the bottom portion of the mold.

As shown in FIGS. 8-9, after molding, the handle 12 is formed of a single, hollow handle tube 72, with a plurality of ports 58 extending through the tube 72. The ends of the port walls 74 are bonded to the portions of the handle tube 72 surrounding the ports 58, and the inwardly facing surfaces 76 of the ports 58 extend completely through the handle tube 72.

The composite material used is preferably carbon fiber reinforced epoxy because the objective is to provide reinforcement at the lightest possible weight. Other fibers may be used such as fiberglass, aramid, boron and others. Other thermoset resins may be used such as polyester and vinyl ester. Thermoplastic resins may also be used such as nylon, ABS, PBT and others.

The hockey stick system of the present invention becomes unique when the ports are molded into the structure. It is not necessary to change the exterior dimensions of the shaft when molding apertures. Therefore, the shaft becomes much more aerodynamic because the frontal area is significantly reduced. This is a great benefit to a hockey stick system. The hockey stick is long in length and can be difficult to generate fast swing speeds. For example, compared to a golf shaft which is about the same length, the hockey stick system is about four times to about six times greater in frontal area, therefore being much less aerodynamic.

Having aerodynamic apertures in the hockey shaft can significantly reduce aerodynamic drag. The size and spacing of each aperture can vary according to desired performance parameters. The orientation, or axis of the apertures is in line with the swing direction of the shaft therefore maximizing the aerodynamic benefit.

The size and spacing of the apertures can affect shaft stiffness in a desirable way. These apertures can direct the flexpoint of the shaft toward the lower portion of the shaft if desired. A hockey stick system with a lower flex point is said to provide more velocity to the shot.

An unexpected benefit of the apertures in the shaft is that they actually improve the durability and strength of the shaft. This is because they act as arches to distribute the stress and strain in a very efficient manner.

During molding, the socket 32 may be formed using existing methods for forming a hollow graphite hockey stick handle.

Alternatively, a hockey stick of the present invention can be molded as a one piece structure with the blade portion attached, therefore producing an entire hockey stick. In this case, there is no joint between the shaft and the blade. The stick is made with longer prepreg tubes which are joined to the blade construction prior to molding. The entire stick with all components (shaft and blade) are molded together in one operation. This method provides a means of locating ports closer to the blade portion to achieve even greater aerodynamic advantages It is also possible to have a precured blade, which is then placed in a mold for bonding to the prepreg shaft as it is cured. It is also possible to have a precured (or molded) shaft and blade, then place both into a mold with prepreg reinforcements wrapped around the joint or interface between the shaft and blade in order to make a one piece unit.

It is also possible to use a metal material for the main tube such as aluminum, and bond either composite or metal cylindrical reinforcements (ports) to the aluminum in a similar manner.

The hockey stick system of the present invention is not limited to ice hockey stick systems. It can also be applied to field hockey stick systems. In fact, the aerodynamic benefits have a greater potential with field hockey because the frontal width of field hockey stick systems is much greater than ice hockey shafts.

The hockey stick system can also be applied to lacrosse sticks. Lacrosse sticks are very long in length and therefore carry significant frontal area and would benefit from the improved aerodynamics offered by the ports.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A sports stick of the type having a relatively long handle shaft characteristic of a hockey or lacrosse stick and a striking end secured to said handle shaft which is adapted to control and propel a ball or puck, the striking end being designed for the intended sport;

wherein said handle shaft is formed primarily of a single, hollow primary tube having an interior, said handle shaft being adapted to be held by a player;

wherein said handle shaft is fabricated of a relatively rigid material with limited flexibility; wherein said tube has at least one pair of aligned holes extending through opposite wall portions of said tube; and wherein said handle shaft further includes a hollow port tube associated with each said pair of holes, each port tube having opposite ends disposed in said pair of holes and extending across the interior of said primary tube, and wherein said opposite ends are bonded to said opposite wall portions within said holes to form a port extending across said interior.

2. The stick as set forth in claim 1, wherein the primary tube and each port tube are made of composite material.

3. The stick as set forth in claim 2, wherein the stick is a hockey stick.

4. The stick as set forth in claim 2, wherein said handle shaft and said striking end are one piece.

5. The stick as set forth in claim 2, wherein the handle and striking end are separate pieces.

6. The stick as set forth in claim 2, wherein said handle shaft includes a plurality of pairs of aligned holes and a corresponding number of port tubes.

7. The stick as set forth in claim 2, wherein said handle shaft has a longitudinal axis, and wherein said at least one port is at least generally oval in shape, to form a pair of arches, with the long dimension of the oval axially oriented.

8. The stick as set forth in claim 6, wherein said handle shaft has a longitudinal axis, and wherein said ports are at least generally oval in shape, to form a pair of arches, with the long dimension of the oval axially oriented.

9. The stick set forth in claim 1, wherein the port tube is made of metal.

10. The stick set forth in claim 1, wherein the primary tube is made of metal and the port tube is made of a composite material.

11. The stick set forth in claim 1, wherein the primary tube is made of a composite material and the port tube is made of metal.

12. The stick set forth in claim 1, wherein said stick is a field hockey stick.

13. The stick set forth in claim 1, wherein said stick is a lacrosse stick.

14. The stick set forth in claim 1, wherein said handle shaft is formed by heat molding a composite material having unidirectional fibers, and wherein said holes and port tube are formed by providing a pre-preg tube about a mold member, and positioning the pre-preg tube and mold member, prior to molding, between fibers on said opposite wall portions, so that, during molding, said holes are formed without breaking or cutting of fibers.

15. A composite hockey stick for producing geometric shapes and improving the flexibility and strength and other playing characteristics of the hockey stick comprising, in combination: a stick handle fabricated of a handle tube of multiple plies of carbon filaments held together with an epoxy binder, the filaments of each ply being parallel to one another, the stick handle having a long generally hollow rectangular configuration having a top end, a bottom end, a front face, a rear face, and a pair side faces; at least one pair of aligned holes extending through the front and rear faces; and a hollow port tube extending through each said pair, wherein said port tube has a peripheral wall and opposite ends, and wherein said opposite ends are disposed in said holes and bonded to said handle tube.

16. The hockey stick as recited in claim 15, wherein said handle includes a plurality of pairs of aligned holes extending through the front and rear faces and a corresponding number of port tubes.

* * * * *